Figure 1:
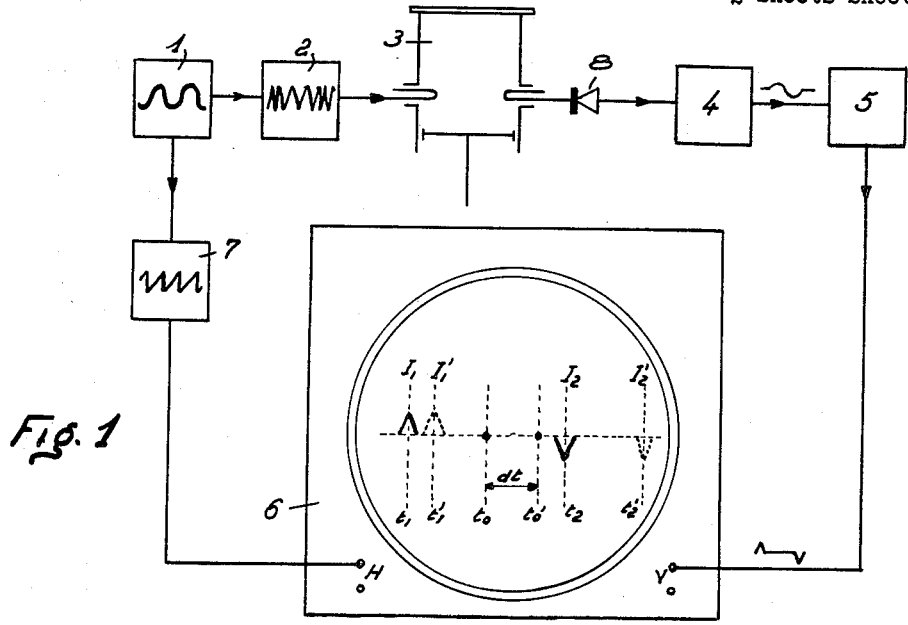

Oct. 25, 1955

M. DENIS 2,721,997

FREQUENCY MODULATED WAVE APPARATUS

Filed July 22, 1952

2 Sheets-Sheet 1

INVENTOR:
MARCEL DENIS
BY:

United States Patent Office 2,721,997
Patented Oct. 25, 1955

2,721,997

FREQUENCY MODULATED WAVE APPARATUS

Marcel Denis, Paris, France, assignor to Compagnie Generale de Telegraphie Sans Fil, a corporation of France Application July 22, 1952, Serial No. 300,303

Claims priority, application France August 2, 1951

3 Claims. (Cl. 343—14)

This invention relates to frequency modulated wave apparatus.

It is often required, in testing and examining frequency modulation apparatus to determine precisely the curve connecting instantaneous frequency plotted against time. It is common, at present, to use for this purpose an adjustable frequency selective circuit, in particular, in the case of ultra high frequency work, a resonant cavity which is coupled to the field of the frequency-modulated wave to be examined. This circuit may be tuned to any frequency in the modulation band and the time elapsing between the passages of the frequency of the source from an initial value to a value corresponding to the tuning of the measuring circuit is measured, this latter passage being accompanied by an absorption of energy (which is indicated by any convenient suitable indicator device) by the measuring circuit. The frequency curve is then plotted point by point against time.

Such an arrangement does not give measurement of the desired high accuracy, because the tuned circuit cannot be made of very high selectivity (sharpness), that is to say, of very high Q for if a certain value of Q, is exceeded the circuit will not respond to all the values of frequency which may be applied to it, its dynamic resonance curve becomes deformed and flattened, and the instant of energy absorption as indicated by the indicator does not accurately correspond to the time at which the frequency applied is the same as the resonance frequency of the measuring circuit.

The object of the present invention is to provide improved arrangements giving greater accuracy and also capable of use not only for plotting the curve of frequency with time, but also for measuring the slope of this curve. Apart from its general application to the determination of frequency modulation characteristics and the investigation of circuits subjected to a frequency-modulated wave, the invention is of particular application to frequency-modulated radar indicators, where it may be used to give indication of increased accuracy and based on a new principle.

The invention consists essentially in passing the output current of a resonant cavity (to which the field of the frequency-modulated wave is coupled as in known arrangements) through a quadratic detector and through a differentiating circuit, and utilising for measurement purposes the peaks of the curve connecting frequency with the output current of the differentiating circuit.

In a preferred embodiment of the invention, this current is fed to a circuit which passes only a pair of impulses corresponding to the peaks of the original curve.

Figure 2:
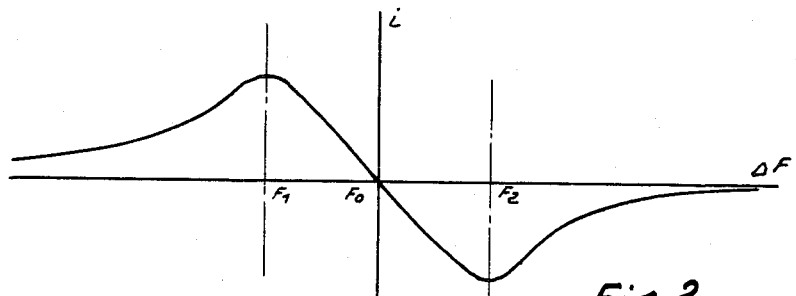
Figure 3:
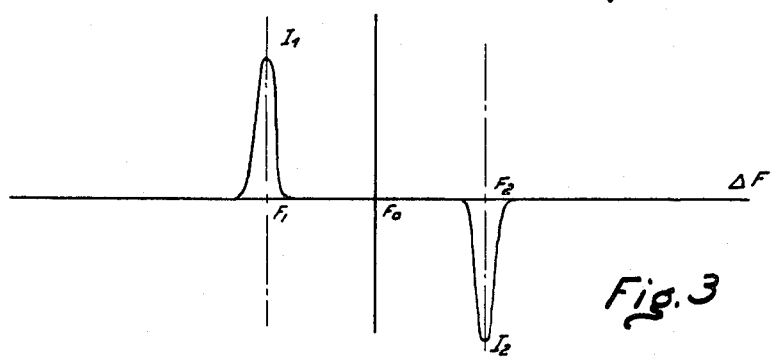
Figure 4:
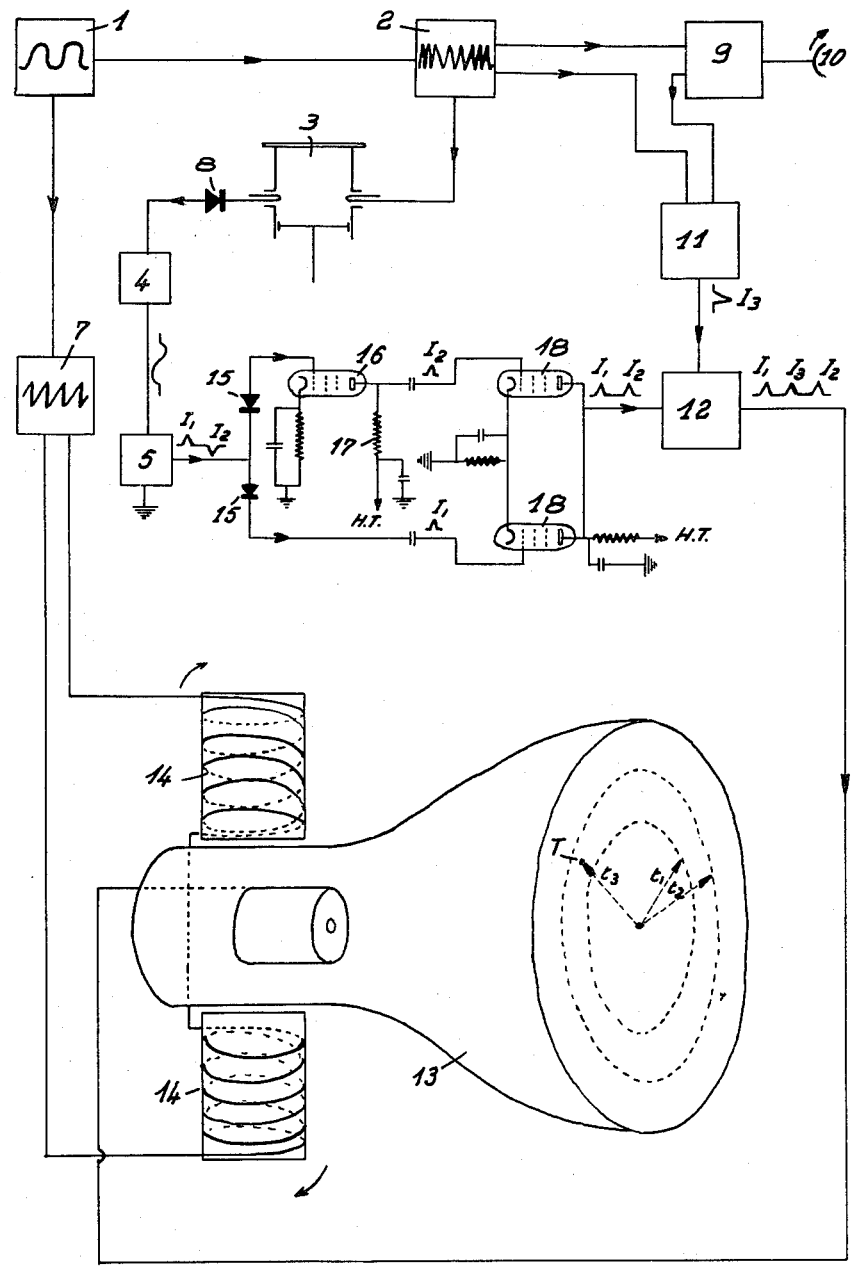

The invention is illustrated in and further explained in connection with the accompanying drawings in which Figures 1 and 4 are diagrams of embodiments and Figures 2 and 3 are explanatory graphical figures.

In Figure 1, a generator 2, for example an ultra-high frequency generator, is frequency-modulated by a modulator 1 which in addition synchronises a saw-tooth wave time base circuit 7. The field of the wave of the generator 2 is coupled to a cavity 3 of high Q and whose resonance frequency $F_0$ is adjustable within the limits of the modulation band of the generator. In accordance with the invention, the output current of the cavity 3 is passed through a quadratic detector 8 followed by a differentiating circuit 4, which may be of any form known per se. It may be shown that the output current from this circuit, expressed as a function of the difference $\Delta F$ between the resonance frequency $F_0$ and the instantaneous frequency of the modulated wave, is of a shape as illustrated in Figure 2, with two peaks at frequencies $F_1$ and $F_2$ equally spaced on either side of $F_0$ and related to the said frequency $F_0$ by the equation $$F_0 - F_1 = F_2 - F_0 = 0.29 \frac{F_0}{Q} \qquad (1)$$

Any suitable well known electronic circuit provided in the unit 5 is employed to suppress the central part of the curve and to reduce it to a pair of impulses $I_1$, $I_2$, as represented in Figure 3, amplified to any desired level.

These impulses are then applied to the vertical deflection terminals V of a cathode ray oscilloscope 6, whose horizontal deflection terminals H are fed from the time base 7. The impulses $I_1$, $I_2$ will accordingly appear on the screen of the oscilloscope.

The patterns produced on the oscilloscope screen are conventionally represented in Figure 1, the time scale being horizontal and various times being represented by $t_1$, $t_1'$, $t_0$, $t_0'$, $t_2$ and $t_2'$ as explained below. As will be apparent it is possible to observe the times $t_1$ and $t_2$ of appearance of the impulses $I_1$ and $I_2$, that is to say, the times $t_1$ and $t_2$ corresponding to the passage of the frequency of the generator 2 through the values $F_1$ and $F_2$ during the cycle of modulation. By noting on the screen the mid-point between $I_1$ and $I_2$, the time of passage $t_0$ of the modulation cycle through the value $F_0$ corresponding to the natural frequency of the cavity 3 is also noted. Then in order to plot for example the curve of the frequency difference $\Delta F$ as a function of time, the following procedure is adopted.

After having marked the point $t_0$ corresponding to the frequency $F_0$, the tuning adjustment of the cavity 3 is changed so that its natural frequency becomes $F_0' = F_0 + dF$. The impules $I_1$, $I_2$ will then be displaced laterally and will appear in new positions such as $I_1'$, $I_2'$. Also the central point between the impulses will be displaced from $t_0$ to $t_0'$. By measuring the interval of time $t_0' - t_0 = dt$, and the values $F_0'$ and $F_0$ being known, the ratio $$\frac{df}{dt}$$

is determined, that is to say the slope of the frequency-time curve. By starting from absence of modulation as an initial point i. e. by starting with $\Delta F = 0$, $t = 0$, and utilising successive values of $F_0$ and the slopes around each point, the desired curve may be built up point by point.

The same apparatus may be used for measuring the Q of the cavity 3. For this purpose, after having marked the frequency $F_0$ and the positions of the impulses $I_1$, $I_2$, resonance frequency of the cavity is adjusted to a value $F_1$ or $F_2$ such that the centre between two new impulses $I_1'$ and $I_2'$ coincides with the positions previously occupied by one of the impulses $I_1$ or $I_2$. The Q value is then given by the relation:

$$Q = \frac{0.29 F_0}{F_0 - F_1}$$

or $$Q = \frac{0.29 F_0}{F_2 - F_0} \qquad (2)$$

In order to understand better the application of the invention to frequency-modulated radars, the theory of such radars will first be briefly reviewed.

In a frequency-modulated radar, the instantaneous frequency of the signal may be written $F_e = F_0 + \Delta F(t)$ and the frequency of the echo signal reflected by a target situated at a distance $d$ from the transmitter may be written $$F_r = F_0 + \Delta F\left(t - \frac{2d}{c}\right)$$

where $c$ is the speed of light.

The resultant from mixing the transmitted and echo signals $F_e$ and $F_r$ is fed to a narrow band filter having pass band centred on a relatively low frequency $F_m$. An impulse $I_3$ is obtained each time that:

$$\Delta F(t) - \Delta F\left(t - \frac{2d}{c}\right) = F_m$$

that is to say (substantially) each time that $$\frac{2d}{c}\left[\frac{d(\Delta f)}{dt}\right]_{t=t_3} = F_m$$

where $t_3$ is the time corresponding to the appearance of the impulse $I_3$.

The distance $d$ is therefore given by the equation $$d = \frac{cF_m}{2\left[\dfrac{d(\Delta F)}{dt}\right]_t} = t_3 \qquad (3)$$

This equation is very general, for it does not specify the form of modulation. It shows that in order to obtain a correct evaluation of distance, the quantity $$\frac{d(\Delta F)}{dt}$$

corresponding to the time $t_3$ must be measured at any instant.

The present invention lends itself admirably to such a measurement.

Figure 4 is a diagram of a radar installation in which, as in the majority of radars, the impulse $I_3$ is utilised to cause the appearance of a spot on a panoramic screen. In addition it has the essential circuits of Figure 1. As in Figure 1, there is a modulator 1, a modulated frequency generator by 2, a variably tunable resonant cavity 3, a quadratic detector (crystal) 8, a differentiating circuit 4, a circuit 5 which separates and amplifies impulses $I_1$, $I_2$ in the output from the differentiating circuit and a time base 7. The generator 2 feeds a rotating aerial 10 through a transmission-reception switch 9, and the frequency-modulated wave reflected by a target and received by the aerial 10 passes again through the switch 9, and, together with the wave then being produced by the generator 2, is fed to a receiver 11 which supplies the impulses $I_3$.

The impulses $I_1$ and $I_2$ of opposite polarities supplied by the unit 5 are fed through two detectors 15 connected in opposite senses to two parallel channels, one of which passes the impulse $I_1$ only, and the other of which passes the impulse $I_2$. In one of these channels is a valve 16, which receives anode potential through a resistance 17 of such value that the gain of the including valve 16 is unity, said valve thus merely causing the signal to undergo a phase shift of 180°. The other channel (including rectifier 15) passes its signal without change. These two channels feed identical amplifier valves 18. Impulses of the same polarity appear at the outputs of these amplifiers and these are combined in a common output circuit to act on a circuit arrangement 12, in which they are superimposed on the impulses $I_3$ delivered by the receiver 11.

The impulses $I_1$, $I_2$, $I_3$ of the same sign delivered by the circuit 12 are passed to the control electrode of the cathode ray tube 13 which operates as a panoramic indicator (so-called P. P. 1 display). For example it may have electromagnetic deflection coils 14 fed with saw-tooth current waves from the time base 7 and rotated around the tube envelope in synchronism with the rotation of the aerial.

The arrangement functions as follows. The impulse $I_3$, which occurs when an echo signal occurs, will cause the appearance on the screen of a spot T whose position in relation to the centre of the screen gives the direction of the target without directly indicating its distance away. The impulses $I_1$ and $I_2$ which are reproduced on each cycle of modulation but are independent of the reflected signal, will cause the appearance on the screen of two concentric circles the radii of which, interpreted as time, are measures of the times $t_1$ and $t_2$ of passage of the instantaneous frequency of the generator 2 through the values $F_1$ and $F_2$ situated on opposite sides of the resonant frequency $F_0$ of the cavity 3. The resonant frequency of the cavity is now adjusted to a value $F_0$ which is such that the circles of radii $t_1$ and $t_2$ are symmetrically on opposite sides of the spot T, that is to say the time $t_3$ of the impulse $I_3$ is the mean of the times $t_1$ and $t_2$. Since $$F_2 - F_1 = 0.58\frac{F_0}{Q}$$

it is possible to write, if this difference is sufficiently small:

$$\left[\frac{d(\Delta F)}{df}\right]_{t=t_3} = \frac{F_2 - F_1}{t_2 - t_1} = \frac{0.58 F_0}{Q(t_2 - t_1)}$$

and the distance of the target is given in accordance with Formula 3 by:

$$d = \frac{cF_m Q}{1.16 F_0}(t_2 - t_1) \qquad (4)$$

The detailed constrictions of the differentiating circuit, the modulated frequency generator, the modulator, the time base circuit, the impulse amplifier, or the different mixer circuits, have not been described herein because these component parts may all be as well known to those skilled in the art and form per se no part of this while the said invention does not in any way depend on the particular circuits used.

I claim:

1. A frequency modulated radar system provided with distance-indicating apparatus, comprising, in combination, a source of frequency modulated oscillations; a tunable resonant circuit connected to said source of frequency modulated signals; detector means connected to said tunable resonant circuit for detecting the oscillatory signals passed by the latter; differentiating means connected to said detector means for differentiating the output thereof as a function of time, the output of said differentiating means being an electrical signal passing through two peaks; peak selector means connected to said differentiating means for selecting the peak portions of the output signal thereof; means operatively connected to said source of frequency modulated signals for transmitting and receiving the same; superimposing means for superimposing the output of said receiving means with the output of said peak selector; and indicating means connected to said superimposed output of said receiving means and said peak selector means for indicating the outputs thereof.

2. A frequency modulated radar system provided with distance-indicating apparatus, comprising, in combination, a source of frequency modulated oscillations; a tunable resonant circuit connected to said source of frequency modulated signals; detector means connected to said tunable resonant circuit for detecting the oscillatory signals passed by the latter; differentiating means connected to said detector means for differentiating the output thereof as a function of time, the output of said differentiating means being an electrical signal passing through two peaks; peak selector means connected to said differentiating means for selecting the peak portions of the output signal thereof; means operatively connected to said source of frequency modulated signals for transmitting and receiving the same, said receiving means including a mixer for heterodyning the transmitted signal with the received signal; superimposing means for superimposing the output of said mixer with the output of said peak selector; and indicating means connected to said superimposed output of said mixer and said peak selector means for indicating the outputs thereof.

3. A frequency modulated radar system provided with distance indicating apparatus, comprising, in combination, a source of recurrently varying voltages; a source of high frequency oscillations connected to said source of recurrently varying voltages and being modulated thereby so as to produce frequency modulated oscillations; a tunable resonant circuit connected to said source of frequency modulated signals; detector means connected to said tunable resonant circuit for detecting the oscillatory signals passed by the latter; differentiating means connected to said detector means for differentiating the output thereof as a function of time, the output of said differentiating means being an electrical signal passing through two peaks; peak selector means connected to said differentiating means for selecting the peak portions of the output signal thereof; means operatively connected to said source of frequency modulated signals for transmitting and receiving the same, said receiving means including a mixer for heterodyning the transmitted signal with the received signal; superimposing means for superimposing the output of said mixer with the output of said peak selector; a saw-tooth sweep generator connected to said source of recurrently varying voltages so as to be synchronized by the latter; and a cathode ray tube having beam rotation means connected to said saw-tooth sweep generator and a control electrode connected to said superimposed outputs of said mixer and said peak selector means.

References Cited in the file of this patent

UNITED STATES PATENTS

| Number | Name | Date |
|---|---|---|
| 2,218,923 | Newhouse | Oct. 22, 1940 |
| 2,483,802 | Bradley | Oct. 4, 1949 |
| 2,498,548 | Howard | Feb. 21, 1950 |
| 2,546,370 | Ostendorf | Mar. 27, 1951 |
| 2,557,869 | Gloess | June 19, 1951 |
| 2,569,129 | Kamm | Sept. 25, 1951 |
| 2,580,968 | Sproull | Jan. 1, 1952 |